UNITED STATES PATENT OFFICE.

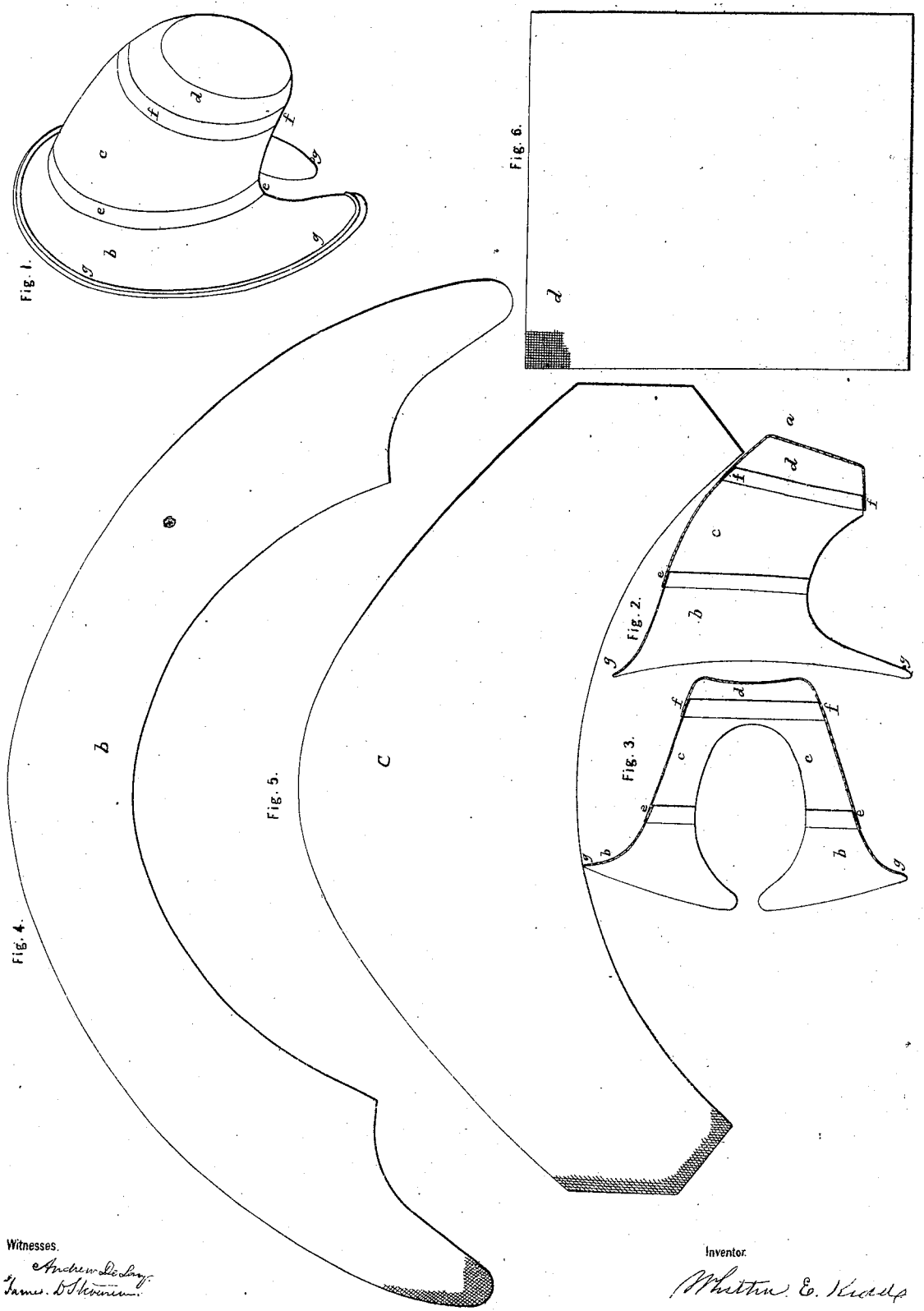

WHITTEN E. KIDD, OF NEW YORK, N. Y.

BONNET-FRAME.

Specification forming part of Letters Patent No. 19,932, dated April 13, 1858; Reissued May 15, 1860, No. 959.

*To all whom it may concern:*

Be it known that I, WHITTEN E. KIDD, of the city, county, and State of New York, have invented a new and useful Improvement in Methods of Making Ladies' Bonnet-Frames of Cape-Net; and I do hereby declare that the following is a full, clear, and exact description thereof, reference being had to the accompanying drawings, making part of this specification, in which—

Figure 1 is a perspective view of a net bonnet frame made according to my improved method; Fig. 2 a vertical section through the front, crown, and tip; Fig. 3 a horizontal section taken at the line 1ª of Fig. 2; and Figs. 4, 5 and 6 separate views of the pieces as cut for making the front, crown, and tip.

The same letters indicate like parts in all the figures.

Net frames for ladies' bonnets have, prior to my invention, been made of a single thickness of cape net sewed onto a previously formed wire frame, to give them the required shape and strength, which not only makes them too heavy, and from the want of elasticity renders them liable to remain out of shape when subjected to accidental pressure. On account of these objections it has long been desired to make bonnet frames of cape net which would retain the required shape without the employment of so many wire stays, but I believe that prior to my invention all such attempts have failed.

The mode of application of my said invention is as follows, viz.—I cut out of two thicknesses of cape net two pieces, Fig. 4, to make the front (*b*), two others, Fig. 5, to make the crown (*c*), and two others, Fig. 6, to make the tip (*d*). But for greater expedition in working I cut some twenty, (more or less) thicknesses at once, as the material is very thin and easily cut. Having cut the parts in this way, I take three thicknesses of the material known as buckram, or other equivalent, moisten one of them with water by rubbing it over with a soft brush dipped in water, or in any other suitable manner, and lay it between the other two dry ones. On these I pile twenty (more or less), thicknesses of the cape net cut as before stated, and on top I lay three thicknesses of buckram prepared in like manner as those below. And on top of that I pile another batch of pieces of cape net, and so proceed until I get the desired quantity, depending on the number of frames to be made, and on the top I lay a board with a slight weight to make a slight pressure, and there let it remain over night, when the whole pile will be found slightly moistened. The next day I take the pieces, two at a time, and subject them to pressure between heated molds of the required configuration by which they will be made to assume the form of the surface thereof, the heat and moisture having the further effect of causing the fibers of the two thicknesses of net to unite where they come in contact, the heat and moisture having the effect to partially dissolve the slightly glutinous substance or sizing employed in the dressing of the fabric, and then to dry it to induce the cementing. The fronts, the crowns, and the tips having been thus shaped, and the two thicknesses partially united, the three parts are then united by lapping over each other as at (*e*) and (*f*), and by the application of moisture, heat, and pressure, as in the well-known process of making bonnet frames of the fabric known as buckram. And after the double thicknesses are united and shaped, and the parts are put together in the manner described, the edge of the bonnet frame is further strengthened by sewing thereto a wire binding (*g*).

When thus formed, bonnet frames made of cape net are much lighter than made as heretofore, and they are so elastic that if pressed out of shape they will spring back, and by reason of this elasticity they are much easier than when made single with wire braces.

What I claim as my invention and desire to secure by Letters Patent is—

Making ladies' bonnet frames of two thicknesses of cape lace, substantially as, and in the manner specified.

WHITTEN E. KIDD.

Witnesses:
WM. H. BISHOP,
JOEL B. WILSON.

[FIRST PRINTED 1912.]